Aug. 13, 1963 K. H. MORGANSTERN 3,100,840
METHODS AND APPARATUS FOR MEASURING AND TESTING
Filed April 14, 1958
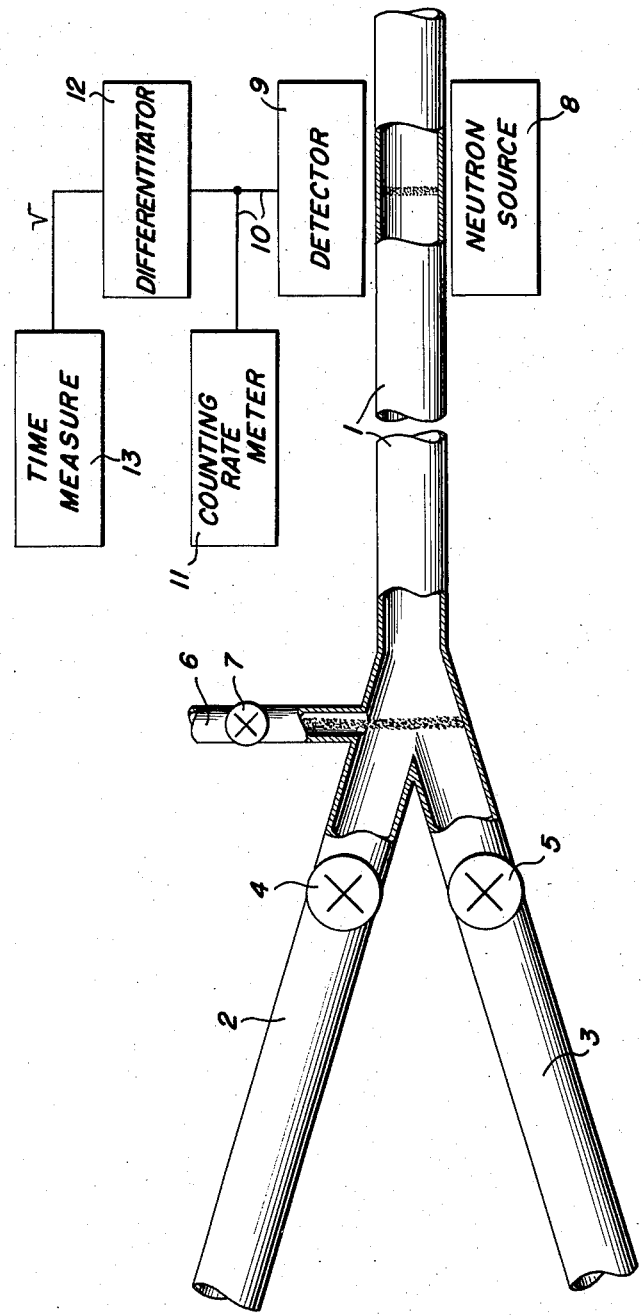
INVENTOR
*KENNARD H. MORGANSTERN*
BY *Harwitz & Rose*
ATTORNEY

United States Patent Office 3,100,840
Patented Aug. 13, 1963

3,100,840
METHODS AND APPARATUS FOR MEASURING AND TESTING
Kennard H. Morganstern, Flower Hill, Roslyn, N.Y., assignor to Nuclear Corporation of America, Inc., Denville, N.J., a corporation of Delaware
Filed Apr. 14, 1958, Ser. No. 728,202
11 Claims. (Cl. 250—43.5)

The present invention relates to detection and identification methods and systems and more particularly to methods and apparatus for detecting identifying, and/or measuring physical objects or events by investigating the presence or absence of a material having a high thermal neutron absorption cross-section.

In recent years there has been a considerable amount of activity in the field of determining the presence or quantity of a material or identifying the occurrence of an event by tagging materials or chemical compounds with radio-active substances. The operation of measuring and detecting systems which depend upon labelling of materials with radio-active substances or atoms has spread throughout many of the industries requiring precise determination of events, conditions or dimensions or in the field of automatic controls and alarms. Examples of such uses are the injection of solutions containing radio-active substances into a pipe line in order to designate the beginning of one batch of crude oil and the ending of the previous batch, and the determination of film thicknesses; wherein the film contains small amounts of radio-active substances distributed uniformly therethrough. Other uses are in leak-detection systems wherein small quantities of material which may have leaked from a closed system may be readily located as a result of minute quantities of radio-active materials in the substance, determining the distribution of fluids through various branches of a system, the intensity of radio-active activity at any part of the system being a measure of the percentage of the total quantity of material distributed to that portion of the system, and in retention tests, that is, tests which determine the length of time which a fluid or a substance is retained in a given region of a flow system.

There has been increasing resistance throughout industry to the extension of the utilization of radio-active materials, since each new use of these materials subjects another segment of the population to a small increase in total sub-atomic radiation. At present it appears extremely unlikely that non-military uses of radio-active materials could increase the average radiation level to a point where it would produce injury to even those humans working in close proximity to such systems. However, there is a natural reluctance on the part of workers to expose themselves even to small amounts of radiation and therefore to whatever extent non-destructive identification and testing can be accomplished without radio-active materials, it is advantageous to do so at least from the view-point of personnel relations.

It is an object of the present invention to provide a method and an apparatus for testing and identifying products, events, etc., which utilize a material having a high thermal neutron absorption cross-section as a material for labelling other materials, or as an indicator for indicating specific physical dimensions or positions.

It is another object of the present invention to utilize a rare earth material having a high thermal neutron absorption cross-section as a material for labelling other materials and for detecting the presence and/or quantity of the high neutron material as an indication of a desired function or event by means of a source of neutrons and a neutron detector, or a gamma ray detector for detecting gamma rays resulting from absorption of neutrons in the high neutron cross-section material.

The thermal neutron absorption cross-section of a material is a measure of the ability of the material to absorb neutrons and incidental thereto, to prevent their passage completely through the material as a result of absorption. A material having a low neutron cross-section is relatively penetrable by neutrons whereas materials having high neutron cross-sections are relatively impenetrable thereby. The difference in the thermal neutron absorption cross-sections of most materials and those considered to have high thermal cross-sections is of the order of magnitude of at least thousands of barns, and the presence of one of these latter materials in the low cross-section materials, even in very small quantities, may be easily detected.

In accordance with the present invention, a high thermal neutron cross-section material, which may preferably constitute one of the rare earth metals or one of their compounds, such as their oxides, and specifically may constitutte the element gadolinium or its compounds, is added to a material having a low neutron cross-section and thereafter the presence of the rare earth material is detected by passing the substance between a neutron source and a neutron detector or a gamma ray detector which detects the gamma rays resulting from absorption of neutrons in the high neutron cross-section material. When a neutron source and neutron detector are employed the rate at which neutrons pass through the material and strike the detector is considerably less when a quantity of the rare earth materials is disposed in the neutron path than when none of this material is present. The reduction in count rate of the detector can be employed quantitatively to idicate an event or may be employed qualitatively to indicate a dimension. As an example of the sensitivity of a system employing the present invention, assume that a material having a neutron cross-section of forty-five-thousand barns, such as gadolinium is added to a material having a cross-section of 0.35 barn, such as oil. The addition of one part gadolinium to approximately one-hundred and twenty-eight thousand parts of oil increases the neutron cross-section of the oil by 100%.

It is apparent, therefore, that relatively small quantities of gadolinium or its compounds or other rare earth metals or their compounds may be added to a material and thereafter readily detected by a neutron source and a neutron detector.

When a neutron source and gamma ray detector are employed, the rate of incidence of gamma rays upon the detector increases in the presence of a rare earth material and this rate of increase may also be employed for quantitative or qualitative determinations. The absorption of thermal neutrons by materials results in the production of gamma rays which may be detected by a gamma ray detector. Since the production of gamma rays results from the absorption of the neutrons and the neutron cross-section is a measure of the ability of the material to absorb neutrons, it is readily apparent that the rate of emission of gamma rays is a measure of its neutron cross-section. Therefore, the indication produced by a gamma ray detector in a system, as described above, produces a direct indication of the presence of and the quantity of a material of high neutron cross-section in the material subject to neutron bombardment.

One of the advantages of utilizing high neutron cross-section materials as tracer or label over the utilization of radio-active materials for the same purpose is that the high neutron cross-section materials do not introduce radio-activity throughout an entire system in which a tracing or labelling function is desirable. The utilization of high neutron cross-section materials permits the neutron source to be located at a predetermined fixed location which may be well-shielded, thereby to minimize and localize radiation effects. Actually, the system may be shielded to the extent necessary to prevent substantially any radio-activity escaping into a surrounding region. The rare earth materials have substantially no residual radio-activity and therefore although they do absorb neutrons to produce gamma rays, this phenomenon lasts only so long as the material is subjected to neutron bombardment and therefore the high neutron cross-section materials become completely harmless as soon as they are removed from the region of the neutron stream.

There are a number of applications to which the methods and apparatus of the present invention may be applied, and in one example the interface between two batches of crude oil in a pipe line may be marked by injecting a gadolinium containing solution, such as gadolinium oxide dissolved in weak acids such as acetic or formic, into the line between the two batches of oil. The gadolinium solution may be immiscible in oil so that a sharp and substantially permanent interface is produced. The indication of the termination of one batch of oil and the beginning of another batch of oil is necessary in the crude oil business, where the oil from various producers is pumped through a common line. A record must be kept of the beginning and ending of flow to the line from each individual producer so that proper credit is given to each supplier. For example, the interface between two batches of oil is labelled or indicated by the gadolinium solution and the interface is detected at any point along the common pipe line by placing a neutron source and detector on opposite sides of the line. When the gadolinium containing solution passes between the neutron source and neutron or gamma ray detector there is a sudden reduction in the rate at which neutrons, or a sudden increase in the rate at which gamma rays impinge upon the detector and this change provides a ready indication of the interface between the two quantities of oil.

The fact that the tracer element employed in accordance with the method of the invention is not radio-active, opens up many fields to rapid inspection and detection methods which were not otherwise practical where radio-active materials were required. As a specific example, a manufacturer may permanently label his product by employing small amounts of gadolinium oxide in the materials from which the product is fabricated and similarly various batches of a product may be labelled by employing different amounts of the material in each batch.

The method and apparatus of the present invention may also be employed in more conventional systems such as determining thickness of materials or coatings by mixing a predetermined amount of the tracer material in the coating material and thereafter measuring the rate of neutron absorption as an indication of thickness. Also, the high neutron cross-section material may be placed in a solution and mixed with fluids in a flow system so as to detect the flow path of materials in the system or the residue of a material therein after predetermined lengths of time. The utilization of the methods and apparatus of the present invention in the fields of biology and studies of body chemistry are practical only to the extent that non-toxic compounds of rare earth materials are available. To the extent that such compounds are available, the concepts of the invention may be employed in this field, in the same manner as radio-active materials.

A specific example of the application of the method and apparatus of the present invention is illustrated in the single FIGURE of the accompanying drawing, wherein there is provided a pipe line system for feeding batches of crude oil from different supply lines into a single pipe line. Referring specifically to the figure of the accompanying drawing, a main oil pipe line 1 is supplied with oil from at least two distinct sources, not illustrated, via a first feeder line 2 and a second feeder line 3. The line 2 communicates with the main pipe line 1 via a shut-off valve 4 while the feeder line 3 feeds the line 1 through a feeder valve 5. If it is assumed that the feeder lines 2 and 3 are supplied with oil from sources owned by different owners, then it is necessary for the owner of the main line 1 to maintain a record of the quantity of oil supplied from each of the lines 2 and 3 for billing purposes. In accordance with the present invention the beginning and ending of each batch of oil from the distinct feeder lines 2 and 3 is indicated by injecting a solution of a rare earth metal or compound into the line 1 via a pipe 6 having a valve 7 disposed therein. At the termination of flow from one of the lines 2 or 3 and the beginning of flow from the other of these two lines, the valve 7 is open to introduce a quantity of the solution into the main line 1. It is preferable that the fluid introduced through the pipe 6 into the pipe 1 be immiscible in the material in the line 1, namely, crude oil, so that the interface between the two batches of oil remains clearly indicated. In order to detect the interface between the two batches of oil and to determine the quantity of oil supplied from either of the two sources, there is provided at a convenient location along the pipe 1, a source 8 of neutrons and a neutron or gamma ray detector 9 disposed on opposite sides of the pipe 1 from the source 8. If the rate of flow of fluid through the pipe 1 is known, then all that must be measured in order to determine the quantity of oil supplied from either of the pipes and also the beginning and ending of the supply from either of the pipes, is a time-measuring device such as the apparatus 10.

The passage of the gadolinium bearing material between the source 8 and detector 9 is readily detected in consequence of a sudden reduction in a rate at which neutrons impinge upon the detector 9. Thus, the sudden drop in signal developed by the detector 9 may be utilized to trigger a time-measuring device for measuring the elapsed time between two such signals which interval, is directly proportional to the quantity of material supplied. In the apparatus illustrated, the solution may also be utilized to indicate from which of the two lines the oil is being supplied. Specifically, at the end of supply from the line 2 and the beginning of supply from the line 3, one quantity of gadolinium bearing material may be introduced into the pipe 1, whereas when the termination of flow from the pipe 3 and the initiation of flow from the pipe 2 is to take place, a different quantity of gadolinium bearing material may be introduced. In such a case the magnitude of the reduction in the counting rate of the detector 9 produces an indication of the source of the material.

Referring now to the figure of the drawing the output voltage of the detector 9 is applied via a lead 10 to a radiation counter 11 which indicates the rate at which neutrons or gamma rays reach the detector 9. The lead 10 is also coupled to a differentiating and rectifying circuit 12 which produces a pulse in response to a change in voltage on lead 10 and applies the pulse to a time measuring and indicating circuit 13. The information provided by the counter circuit 11 indicates the source of each batch and the time measuring circuit 13 provides, assuming a constant rate of flow, an indication of the quantity supplied by each source. The two indications may be recorded on a single chart to provide a convenient tally sheet.

The example illustrated in the figure of the acompanying drawing is intended to indicate just one of the many uses of the high thermal neutron absorption cross-section materials as indicators of specific events or parameters in a system. The system is completely flexible and since the region of the source and detector may be completely shielded in consequence of its small size, the system is completely safe and eliminates all danger of radiation throughout the entire operation.

While I have described and illustrated one specific embodiment of my invention, it will be clear that variations of the details of construction which are specifically illustrated and described may be resorted to without departing

What is claimed is:

1. A method of locating a particular area in a material having a relatively low thermal neutron absorption cross-section comprising, mixing with the material only in the particular area to be subsequently located, a small amount of a substance having a high thermal neutron absorption cross-section to confine said substance to said area, passing the material and substance between a source of thermal neutrons and a detector of sub-atomic radiation and detecting changes in the rate at which sub-atomic particles fall upon the detector.

2. A system for locating at a remote region a particular area of a flowing mass of material of low thermal neutron absorption cross-section comprising means for adding to the mass at said particular area only a substance having a high thermal neutron absorption cross-section whereby said substance is confined to said area, a stationary source of thermal neutrons and a detector of sub-atomic radiations disposed at said remote region adjacent the path of flow of said mass and adapted to have said flowing mass and substance pass therebetween and means for detecting a change in the rate at which sub-atomic particles impinge upon said detector.

3. In combination, a stationary neutron source, detection means arranged to detect radiations derived from said source, means for directing a flow of material between said source and said detection means, means for directing the flow of a first quantity of material having a low neutron cross-section to said first mentioned directing means, means for applying a material having a high neutron cross-section to a portion only of said first quantity of material, and means for thereafter directing the flow of a second quantity of different material having a low neutron cross-section to said first mentioned directing means.

4. In combination, a stationary neutron source, detection means arranged to detect radiations derived from said source, means for directing a flow of material between said source and said detection means, means for directing the flow of a first quantity of material having a low neutron cross-section to said first mentioned directing means, means for applying a material having a high neutron cross-section to a portion only of said first quantity of material, means for thereafter directing the flow of a second quantity of different material having a low neutron cross-section to said first mentioned directing means, and means for timing the intervals between changes in level of said detection means.

5. A method of labelling and detecting a plurality of discrete materials all having a low thermal neutron absorption cross-section comprising adding to the materials small and differing amounts of a substance having a high thermal neutron absorption cross-section, and thereafter identifying the materials by subjecting them to thermal neutron bombardment and measuring the capacity of the materials to react with thermal neutrons.

6. A system for controlling and measuring fluid flow comprising a main pipe, first and second branch pipes connected to said main pipe for selectively supplying fluid of a predetermined type having a low neutron cross section to said main pipe, means including a third branch pipe for selectively supplying fluid to said main pipe which is immiscible with said predetermined type of fluid and which includes material having a high neutron cross section, a source of thermal neutrons adjacent said main pipe, a detector for receiving radiations derived from said neutron source through said pipe, and means coupled to said detector for determining the elapsed time between changes in the radiation level picked up by said detector.

7. A system for controlling and measuring fluid flow comprising a main pipe, first and second branch pipes connected to said main pipe for selectively supplying fluid of a predetermined type having a low neutron cross section to said main pipe, means including a third branch pipe for selectively supplying fluid having a high neutron cross section to said main pipe, a source of thermal neutrons adjacent said main pipe, and a detector for receiving radiations derived from said neutron source through said pipe.

8. A method for controlling and measuring fluid flow comprising passing fluid having a low neutron absorption cross section from a first source into a principal channel, supplying a small quantity of a fluid having a high neutron cross section which is immiscible with said first fluid to said channel upon the cessation of fluid flow from said first source, supplying fluid having a low neutron cross section from a different source to said channel immediately behind the fluid having a high neutron absorption cross section, applying a stream of neutrons to said principal channel detecting radiations resulting from the application of neutrons to the channel, and recording abrupt changes in the energy received in said detecting step.

9. Apparatus for locating an area in a low thermal neutron absorbing medium flowing through a pipe comprising a pipe, means for supplying a material having a low neutron cross-section to said pipe, means for supplying a material having a high neutron cross-section to said pipe, means for causing a flow of both of said materials successively one after the other through said pipe, a thermal neutron source located in proximity to the pipe and a detector for directly receiving thermal neutrons passing through the medium from said source whereby the number of thermal neutrons received by said detector is reduced when the material having a high neutron cross-section passes the said detector and source.

10. A method as recited in claim 1 wherein the substance having a high thermal neutron absorption cross-section is selected from the group consisting of rare earth metals and compounds of rare earth metals.

11. A method as recited in claim 10 wherein said substance is gadolinium.

References Cited in the file of this patent

UNITED STATES PATENTS

| | | |
|---|---|---|
| 2,231,577 | Hare | Feb. 11, 1941 |
| 2,323,128 | Hare | June 29, 1943 |
| 2,335,409 | Hare | Nov. 30, 1943 |
| 2,437,935 | Brunner et al. | Mar. 16, 1948 |
| 2,674,363 | Graham | Apr. 6, 1954 |
| 2,744,199 | Juterbock et al. | May 1, 1956 |
| 2,747,100 | Wyllie et al. | May 22, 1956 |
| 2,873,377 | McKay | Feb. 10, 1959 |
| 2,971,094 | Tittle | Feb. 17, 1961 |

OTHER REFERENCES

Resen: Audio Signal Announces Interface Arrival, Oil and Gas Journal, Nov. 7, 1955.